US007313815B2

(12) United States Patent
Pazi et al.

(10) Patent No.: US 7,313,815 B2
(45) Date of Patent: *Dec. 25, 2007

(54) PROTECTING AGAINST SPOOFED DNS MESSAGES

(75) Inventors: Guy Pazi, Ramat HaSharon (IL); Dan Touitou, Ramat Gan (IL); Alon Golan, Moshav Eliakim (IL); Yehuda Afek, Hod Hasharon (IL)

(73) Assignee: Cisco Technology, Inc., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 10/943,638

(22) Filed: Sep. 17, 2004

(65) Prior Publication Data

US 2005/0044352 A1    Feb. 24, 2005

Related U.S. Application Data

(63) Continuation of application No. 10/251,912, filed on Sep. 20, 2002, now Pat. No. 6,907,525, and a continuation-in-part of application No. 10/232,993, filed on Aug. 29, 2002, now Pat. No. 7,171,683.

(60) Provisional application No. 60/316,198, filed on Aug. 30, 2001.

(51) Int. Cl.
    G06F 15/16    (2006.01)
    H04L 9/00     (2006.01)
    G06F 9/00     (2006.01)

(52) U.S. Cl. ................. 726/7; 709/229; 709/250; 713/154; 713/170; 726/12

(58) Field of Classification Search .......... 726/7; 713/154, 170
See application file for complete search history.

(56) References Cited

U.S. PATENT DOCUMENTS

| 5,511,122 | A | * | 4/1996 | Atkinson | 713/153 |
| 5,689,508 | A | | 11/1997 | Lyles | 370/391 |
| 5,805,803 | A | * | 9/1998 | Birrell et al. | 726/12 |
| 5,826,014 | A | * | 10/1998 | Coley et al. | 726/12 |
| 5,898,830 | A | * | 4/1999 | Wesinger et al. | 726/15 |
| 5,905,730 | A | | 5/1999 | Yang et al. | 370/429 |
| 5,961,593 | A | * | 10/1999 | Gabber et al. | 709/219 |

(Continued)

FOREIGN PATENT DOCUMENTS

WO    WO-02/33870 A1    4/2002

OTHER PUBLICATIONS

Needham et al., "Using Encryption for Authentication in Large Networks of Computers," Communications of the ACM, vol. 21, No. 12, pp. 993-999, 1978.*
Eastlake, RFC 2535, "Domain Name System Security Extensions", 1999, pp. 1-47.
"Practical Approaches to Dealing with DdoS Attacks", Presented at North America Network Operators' Group (NANOG22, Scottdale, Arizona), May 2001.
Mockapetris, "Domain Names—Concepts and Facilities", published as Request for Comments (RFC) 1034, 1987, of the Internet Engieering Task Force (IETF) Network Working Group.

(Continued)

*Primary Examiner*—Matthew Heneghan
(74) *Attorney, Agent, or Firm*—Darby & Darby

(57) ABSTRACT

A method for authenticating communication traffic includes receiving a first request, such as a DNS request, sent over a network from a source address, to provide network information regarding a given domain name. A response is sent to the source address in reply to the first request. When a second request is from the source address in reply to the response, the authenticity of the first request is assessed based on the second request.

49 Claims, 5 Drawing Sheets

U.S. PATENT DOCUMENTS

| | | | |
|---|---|---|---|
| 6,055,236 A | 4/2000 | Nessett et al. | 370/389 |
| 6,072,800 A | 6/2000 | Lee | 370/412 |
| 6,134,217 A | 10/2000 | Stiliadis et al. | 370/232 |
| 6,182,226 B1 | 1/2001 | Reid et al. | 713/201 |
| 6,185,680 B1 | 2/2001 | Shimbo et al. | 713/160 |
| 6,208,652 B1 | 3/2001 | Stephens et al. | 370/395.41 |
| 6,256,671 B1 * | 7/2001 | Strentzsch et al. | 709/227 |
| 6,279,113 B1 | 8/2001 | Vaidya | |
| 6,304,913 B1 | 10/2001 | Rune | 709/241 |
| 6,324,648 B1 * | 11/2001 | Grantges, Jr. | 726/12 |
| 6,335,927 B1 | 1/2002 | Elliott et al. | 370/352 |
| 6,487,666 B1 | 11/2002 | Shanklin et al. | |
| 6,502,135 B1 | 12/2002 | Munger et al. | 709/225 |
| 6,839,761 B2 * | 1/2005 | Kadyk et al. | 709/229 |
| 6,907,525 B2 * | 6/2005 | Pazi et al. | 713/170 |
| 2001/0054157 A1 | 12/2001 | Fukumoto | 726/11 |
| 2002/0083175 A1 | 6/2002 | Afek et al. | 709/225 |
| 2002/0188862 A1 * | 12/2002 | Trethewey et al. | 713/201 |
| 2003/0041091 A1 * | 2/2003 | Cheline et al. | 709/200 |
| 2004/0093513 A1 | 5/2004 | Cantrell et al. | |

OTHER PUBLICATIONS

"Domain Names—Implementation and Specification", published as IETF RFC 1035, 1987.

Pazi, et al., U.S. Appl. No. 10/232,993, "Protecting Against Distributed Denital of Service Attacks", Aug. 29, 2002.

* cited by examiner

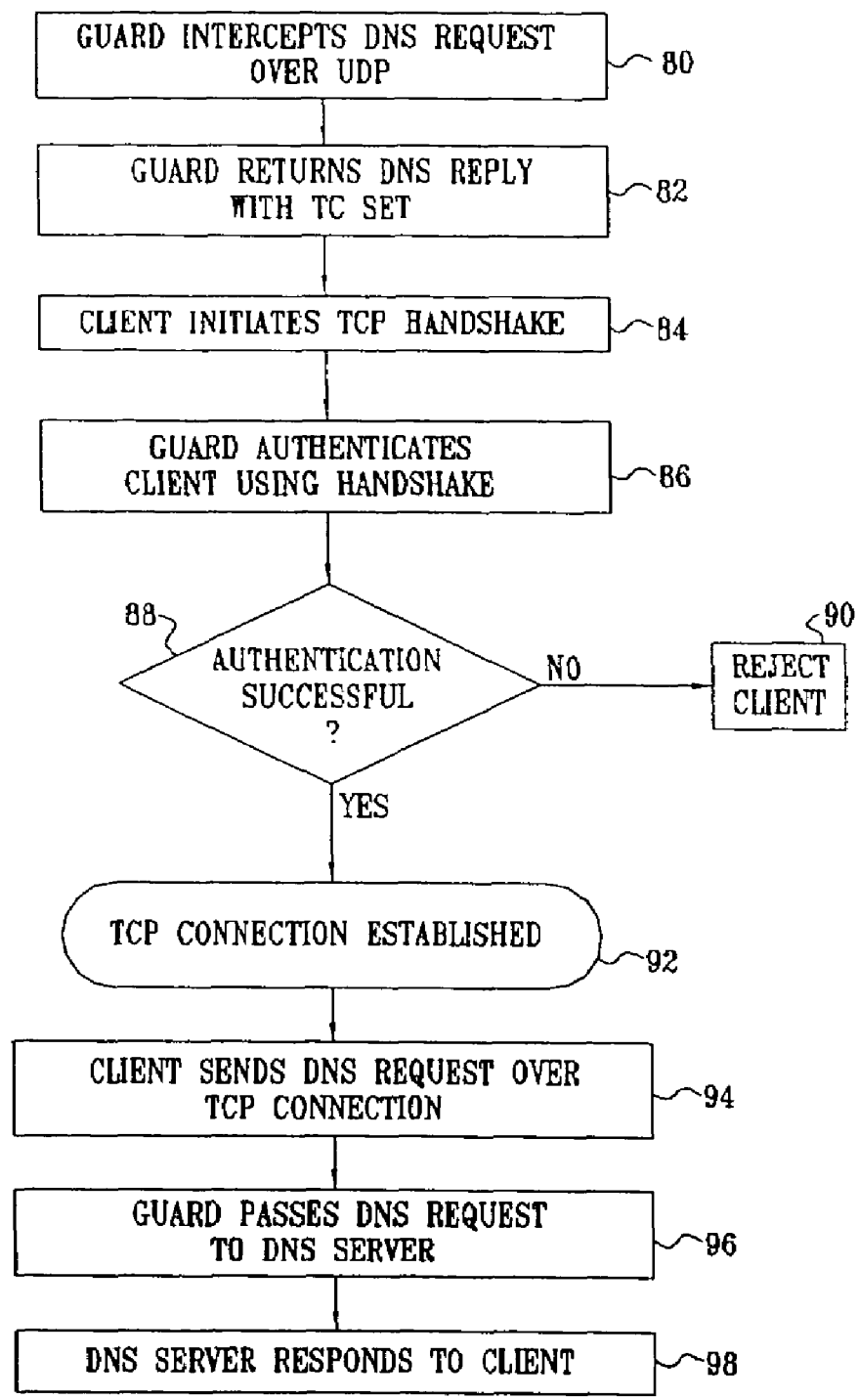

PROTECTING AGAINST SPOOFED DNS MESSAGES

CROSS-REFERENCE TO RELATED APPLICATIONS

This application is a continuation of U.S. patent application Ser. No. 10/251,912, filed Sep. 20, 2002, now U.S. Pat No. 6,907,525 which claims the benefit of U.S. Provisional Patent Application 60/323,979, filed Sep. 21, 2001, and is a continuation-in-part of U.S. patent application Ser. No. 10/232,993, filed Aug. 29, 2002 now U.S. Pat No. 7,171,683. It is also related to co-pending U.S. patent application Ser. No. 09/929,877, filed Aug. 14, 2001. All of these related applications are assigned to the assignee of the present patent application, and their disclosures are incorporated herein by reference.

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic. The traffic overload consumes the victim's available bandwidth, CPU capacity, or other critical system resources, and eventually brings the victim to a situation in which it is unable to serve its legitimate clients. Distributed DoS (DDoS) attacks can be even more damaging as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker. Many attacks, however, now use "spoofed" IP packets—packets containing a bogus IP source address—making it more difficult for the victim network to defend itself against attack.

Domain Name System (DNS) servers are a favored target of DDoS attackers. DNS is an essential component of the Internet protocol suite, without which most Internet services are disabled. DNS provides a distributed database of domain names and their associated information, such as IP addresses and alias names. DNS servers use the database to translate domain names into their corresponding IP addresses and to retrieve other information associated with specific names. DNS is described in detail by Mockapetris in "Domain Names—Concepts and Facilities," published as Request for Comments (RFC) 1034 (1987) of the Internet Engineering Task Force (IETF) Network Working Group; and in "Domain Names—Implementation and Specification," published as IETF RFC 1035 (1987). Both of these documents are incorporated herein by reference. They are available at www.ietf.org.

The DNS protocol is based on queries and responses (also referred to as requests and replies). The queries are directed from a client (which may itself be a DNS server) to a name server (NS), requesting information regarding a specific domain name. Each such query asks for either the IP address of the domain name or information that could be used in order to find the requested information. The DNS server returns a response to the client, containing one or more Resource Records (RR), each of which corresponds to a specific domain name. Each such RR is represented in the reply by a triple (domain name, type, value), with the following meanings:
1. Domain name: The key of the RR, normally the domain name about which a query was made.
2. Type: Either A, or NS, or CNAME, as described below.
3. Value: The content of the RR, which may be an IP address (for type A) or another domain name (for type NS or CNAME).

The RR in the reply also carries a Time-To-Live (TTL) parameter, indicating the length of time for which the client may keep this RR in its cache. If TTL=0, the client should not store the record, and should consult a DNS server again the next time it requires information associated with the domain name in question.

The DNS request may also include an identifier (ID) field, with a unique ID generated by the requesting client. The server inserts this ID in the DNS response, thus enabling the client to associate the response with its own, earlier request.

Each RR in the DNS database is essentially a pair of a domain name (the key of the RR) and a piece of information related to this domain name. There are three types of RR of relevance to the present invention: A, NS, and CNAME:
   Resource record of type A: The content of a RR of this type is simply the IP address of the key.
   Resource record of type DNS Server (type NS): The content of a RR of this type is another domain name. The domain name in the RR is the name of a domain name server, which is the "authority server" for the key domain name. The semantics of this record type is "you should ask the name server whose name is listed here for the IP address of the key," i.e., it redirects the requester to the authority name server.
   Resource record of type Canonical Name (type CNAME): The content of a RR of this type is again a domain name, but in this case it is another domain name for which the key domain name is an alias. This record redirects client to query a name server using the canonical name as the new key.

In a DDoS attack on a DNS server, a hacker typically submits a large number of simultaneous DNS requests, which overload the capability of the server to respond. The DNS protocol does not use any handshake mechanism, and the notion of a session between the client and the server does not exist. The vast majority of DNS request and reply traffic on the Internet is over the User Datagram Protocol (UDP), which is a connectionless protocol. Therefore, it is easy for hackers to spoof DNS/UDP messages (including the source IP address) and thus to overload the DNS server without the server being able to easily identify the source IP addresses from which the attack is coming.

SUMMARY OF THE INVENTION

It is an object of some aspects of the present invention to provide methods and devices for detecting spoofed packets, and particularly for distinguishing between spoofed and authentic DNS requests.

It is a further object of some aspects of the present invention to provide methods and devices for guarding a DNS server against DDoS attacks.

In preferred embodiments of the present invention, a network guard system screens DNS request packets submitted by clients to a DNS server. Typically, the guard system compares the IP source addresses of incoming packets against records of valid addresses that the guard system maintains. When a DNS request is received from an unknown or suspicious source address, the guard system initiates a challenge-response exchange of messages with the source, in order to verify that the request is legitimate, and not spoofed. (In the context of the present patent application, a "legitimate" or "authentic" DNS request is one that has an authentic IP source address and was, in fact, sent from that IP source address.) Only after the guard system has verified the legitimacy of the DNS request, does it allow the request to reach the DNS server. The server then sends a DNS response in the normal manner.

In some preferred embodiments of the present invention, the guard system verifies the legitimacy of a DNS request by returning a DNS response to the source address containing encoded information, referred to herein as a "cookie." This DNS response redirects the client to submit another DNS request. A legitimate client will in this case submit a new DNS request, which will itself contain the cookie. The guard system intercepts this request and checks that it contains the proper cookie. If so, the guard system recognizes the IP address of the client as legitimate, and allows the client to access the DNS server. On the other hand, if the original client IP source address was spoofed, the client will never receive the DNS response sent by the guard system, and therefore will not return the expected DNS request with the cookie. Thus, the guard system uses the DNS protocol itself to verify the authenticity of both the DNS request and the IP address from which the request was received, so as to prevent DNS-based DDoS attacks on the server.

Although DNS is usually carried over UDP, as noted above, DNS packets may also be carried over Transport Control Protocol (TCP) connections. Thus, in other preferred embodiments of the present invention, when the guard system receives a DNS request from an unknown or suspicious IP source address, it forces the client to repeat the request over TCP. The client establishes a TCP connection with the guard system, using the conventional three-way handshake mandated by the TCP protocol. The guard system uses the handshake to verify the authenticity of the client. Once the handshake is completed, the TCP connection can be used to return the proper DNS response to the client.

The methods of DNS request validation described herein may be used on their own, or in combination with other, complementary techniques for preventing DDoS attacks. Such techniques are described, for example, in the above-mentioned U.S. patent applications.

As noted above, in some embodiments of the present invention, the guard system uses a redirection mechanism provided by the DNS protocol in order to protect against spoofing of a client. Redirection mechanisms are present in other communication protocols, as well, such as the Hypertext Transfer Protocol (HTTP). The redirection-based techniques described herein for message and source address authentication may likewise be applied to HTTP and other protocols.

There is therefore provided, in accordance with a preferred embodiment of the present invention, a method for authenticating communication traffic, including:

receiving a first request, sent over a network from a source address, to provide network information regarding a given domain name;

sending a response to the source address in reply to the first request;

receiving a second request from the source address in reply to the response; and assessing authenticity of the first request based on the second request.

Preferably, the method includes, if the first request is assessed to be authentic, sending a further response to the source address containing the network information corresponding to the given domain name. Most preferably, assessing the authenticity includes discarding the first request if the first request is not assessed to be authentic. Typically, the network information includes a network address associated with the domain name.

Preferably, sending the response includes encoding information in the response, and assessing the authenticity includes checking the second request for the encoded information. Most preferably, encoding the information includes encoding the information in an artificial domain name, and receiving the second request includes receiving a query for the network information corresponding to the artificial domain name.

Typically, receiving the first request includes intercepting the first request prior to delivery of the first request to a destination address of the first request, and the method includes submitting the first request to the destination address responsively to the assessed authenticity of the first request. Preferably, assessing the authenticity includes making a record of the source address as an authentic address, and submitting the first request includes verifying the source address based on the record, and allowing the network information to be furnished to the verified source address.

In preferred embodiments, the first and second requests and the response includes data packets, and the source address includes an Internet Protocol (IP) address. Typically, the first and second requests respectively include first and second Domain Name System (DNS) requests, and the response includes a DNS response.

In one embodiment, receiving the first request includes receiving a Domain Name System (DNS) request in a User Datagram Protocol (UDP) packet, and sending the response includes configuring the response so as to require that the first request be resent in a Transmission Control Protocol (TCP) packet, and receiving the second request includes receiving a TCP SYN packet. Preferably, the method further includes opening a TCP connection responsive to the TCP SYN packet, and providing the network information regarding the given domain name over the connection.

There is also provided, in accordance with a preferred embodiment of the present invention, a method for authenticating communication traffic, including:

receiving a data packet sent over a network from a source address to a destination address;

sending an outgoing Domain Name System (DNS) message to the source address;

receiving an incoming DNS message in response to the outgoing DNS message; and processing the incoming DNS message so as to assess authenticity of the received data packet.

Typically, receiving the data packet includes receiving a first DNS request directed to a DNS server, and sending the outgoing DNS message includes sending a DNS response, and receiving the incoming DNS message includes receiving a second DNS request. Preferably, if the received data packet is assessed to be authentic, the method includes sending a further DNS response to the source address so as to provide a resource record from the DNS server as requested by the first DNS request. Most preferably, receiving the first DNS request includes intercepting the first DNS request prior to delivery of the first DNS request to the DNS server, and the method includes allowing the DNS server to provide the resource record to the source address responsively to the assessed authenticity of the of the received data packet.

Preferably, receiving the first DNS request includes receiving a request from a client for network information regarding a first domain name, and sending the DNS response includes sending a first DNS response redirecting the client to submit the second DNS request with regard to a second domain name. Most preferably, redirecting the client includes encoding information in the second domain name, and processing the incoming DNS message includes checking for the encoded information in the second DNS request. Further preferably, the method includes, if the encoded information in the second DNS request is correct, sending a second DNS response redirecting the client to submit a third DNS request in order to receive the network information requested by the first DNS request.

Preferably, sending the outgoing DNS message includes sending a first DNS packet containing encoded information, and receiving the incoming DNS message includes receiving a second DNS packet, and processing the incoming DNS message includes checking the second DNS packet for the encoded information. Most preferably, sending the first DNS packet includes inserting the encoded information in an artificial domain name in the first DNS packet, and checking the second DNS packet includes examining the artificial domain name in the second DNS packet.

There is additionally provided, in accordance with a preferred embodiment of the present invention, apparatus for authenticating communication traffic, including a guard device, which is adapted to receive a first request, sent over a network from a source address, to provide network information regarding a given domain name, to send a response to the source address in reply to the first request, to receive a second request from the source address in reply to the response, and to assess authenticity of the first request based on the second request.

Preferably, the apparatus includes a memory, wherein the guard device is adapted, upon assessing the first request to be authentic, to make a record of the source address in the memory as an authentic address, and upon receiving a further request from the source address, to verify the source address of the further request based on the record, so as to allow the server to furnish the network information to the verified source address.

There is further provided, in accordance with a preferred embodiment of the present invention, apparatus for authenticating communication traffic, including a guard device, which is adapted to receive a data packet sent over a network from a source address to a destination address, to send an outgoing Domain Name System (DNS) message to the source address, to receive an incoming DNS message in response to the outgoing DNS message, and to process the incoming DNS message so as to assess authenticity of the received data packet.

There is moreover provided, in accordance with a preferred embodiment of the present invention, a computer software product for authenticating communication traffic, including a computer-readable medium in which program instructions are stored, which instructions, when read by a computer, cause the computer to receive a first request, sent over a network from a source address, to provide network information regarding a given domain name, to send a response to the source address in reply to the first request, to receive a second request from the source address in reply to the response, and to assess authenticity of the first request based on the second request.

There is furthermore provided, in accordance with a preferred embodiment of the present invention, a computer software product for authenticating communication traffic, including a computer-readable medium in which program instructions are stored, which instructions, when read by a computer, cause the computer to receive a data packet sent over a network from a source address to a destination address, to send an outgoing Domain Name System (DNS) message to the source address, to receive an incoming DNS message in response to the outgoing DNS message, and to process the incoming DNS message so as to assess authenticity of the received data packet.

There is also provided, in accordance with a preferred embodiment of the present invention, a method for authenticating communication traffic, including:

receiving a message, sent over a network from a source entity to a first destination entity;

sending a response to the source address, in answer to the message, redirecting the source address to communicate with a second destination entity; and communicating with the source entity using the second destination entity in order to assess authenticity of the message.

Preferably, receiving the message includes receiving the message in accordance with a predetermined communication protocol, and sending the response includes using a redirection mechanism provided by the communication protocol. Typically, communicating with the source entity includes receiving a further message submitted by the source entity to the second destination entity in reply to the response. In a preferred embodiment, the communication protocol includes a Domain Name System (DNS) protocol or a Hypertext Transfer Protocol (HTTP).

Preferably, the first and second destination entities include first and second domain names, respectively.

There is additionally provided, in accordance with a preferred embodiment of the present invention, a method for providing information from a database maintained by a server, including:

holding a cache of entries from the database on a proxy device separate from the server;

intercepting at the proxy device a request conveyed by a requester over a communication network to the server to receive information from the database; and if the information is present in the cache, conveying the information from the proxy device to the requester, without submitting the request to the server.

There is further provided, in accordance with a preferred embodiment of the present invention, apparatus for authenticating communication traffic, including a guard device, which is adapted to receive a message, sent over a network from a source entity to a first destination entity, and to send a response to the source address, in answer to the message, redirecting the source address to communicate with a second destination entity, and to communicate with the source entity using the second destination entity in order to assess authenticity of the message.

There is moreover provided, in accordance with a preferred embodiment of the present invention, apparatus for providing information from a database maintained by a server, including a proxy device, separate from the server, wherein the proxy device is adapted to hold a cache of entries from the database, and to intercept a request conveyed by a requester over a communication network to the server to receive information from the database, and if the information is present in the cache, to convey the information from the proxy device to the requester, without submitting the request to the server.

There is furthermore provided, in accordance with a preferred embodiment of the present invention, a computer software product for authenticating communication traffic, including a computer-readable medium in which program instructions are stored, which instructions, when read by a computer, cause the computer to receive a message, sent over a network from a source entity to a first destination entity, and to send a response to the source address, in answer to the message, redirecting the source address to communicate with a second destination entity, and to communicate with the source entity using the second destination entity in order to assess authenticity of the message.

There is additionally provided, in accordance with a preferred embodiment of the present invention, a computer software product for providing information from a database maintained by a server, the product including a computer-readable medium in which program instructions are stored, which instructions, when read by a computer separate from the server, cause the computer to hold a cache of entries from the database, and to intercept a request conveyed by a requester over a communication network to the server to receive information from the database, and if the information is present in the cache, to convey the information from the proxy device to the requester, without submitting the request to the server.

The present invention will be more fully understood from the following detailed description of the preferred embodiments thereof, taken together with the drawings in which:

BRIEF DESCRIPTION OF THE DRAWINGS

FIGS. 2-5 are flow charts that schematically illustrate methods for validating source addresses of DNS request packets, in accordance with preferred embodiments of the present invention.

DETAILED DESCRIPTION OF PREFERRED EMBODIMENTS

Figure 1:
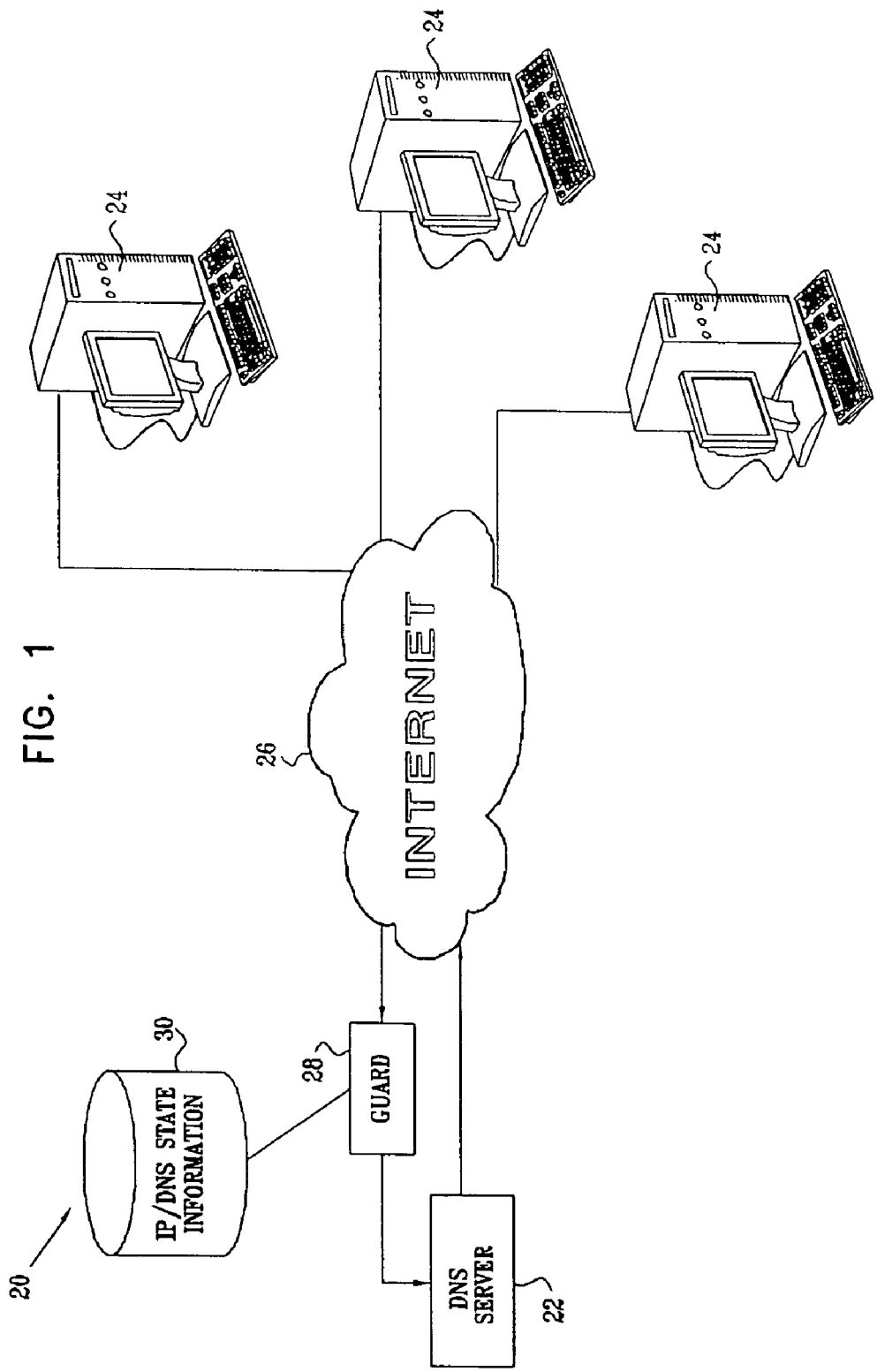
FIG. 1 is a block diagram that schematically illustrates a computer network system, in accordance with a preferred embodiment of the present invention.

FIG. 1 is a block diagram that schematically illustrates a computer network system 20, in accordance with a preferred embodiment of the present invention. A DNS server 22 communicates with clients 24 via a wide-area network (WAN) 26, typically the Internet. To prevent DDoS attacks on server 22, a guard device 28 intercepts incoming DNS request packets from network 26 that are addressed to server 22. The guard device checks the IP source address of each packet that it intercepts against reference values stored in a database 30. (Although in the present embodiment database 30 is used to store IP/DNS records, it will be understood that substantially any suitable memory device and data structure may be used for storing this information, and not only a database.) The guard device may perform these packet screening and verification functions at all times, or it may alternatively become active only under stress conditions, in which a DDoS attack on server 22 is suspected. For example, guard device 28 may become active when it detects an unusually large number of incoming DNS request packets, or when other traffic statistics indicate that an attack may be in progress.

If the source address of an incoming DNS request packet matches an entry in database 30, and the request appears to be legitimate, guard device 28 passes the packet on to server 22. (Even if the source address matches an entry in the database, the guard device may decide to authenticate the request itself if there is reason to suspect a DoS attack, due to an abnormally large volume of DNS requests from this address, for example.) Alternatively, further anti-DDoS processing measures may be carried out before the packet is delivered to the server.

Otherwise, if the source address does not match an entry in the database, or if the source address generates an abnormal volume of DNS request traffic, the guard device regards the current DNS request packet as suspect. It therefore initiates a challenge-response procedure to verify the authenticity of the request and of the IP source address of the client that sent the DNS request. Procedures that may be used for this purpose are described in detail hereinbelow. If the challenge-response procedure is successful in verifying that the DNS request is legitimate (i.e., sent by a real client, and not a spoofed source), the guard device adds the IP source address of the client to database 30 and passes the request on to server 22 for fulfillment. Otherwise, the DNS request is typically discarded. Alternatively, the suspect DNS request may be queued for service with low priority, so that it is handled by server 22 only after all pending legitimate requests have been satisfied.

Typically, guard device 28 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 28 may be implemented in dedicated hardware logic, or using a combination of hardware and software elements. The guard device may be a standalone unit, or it may alternatively be integrated with other communication or computing equipment, such as a firewall or intrusion detection system.

For the sake of simplicity, FIG. 1 shows guard device 28 as protecting only server 22. In practical applications, however, the guard device may be used to protect a cluster of servers, or it may be used to protect an entire LAN, intranet or a collection of servers whose traffic is diverted to the guard device. Although only a single, discrete guard device is shown in FIG. 1, the guard functionality may be distributed among multiple devices, at one or more access points to the DNS server or servers. The guard device may be deployed in configurations similar to firewalls known in the art. The methods described hereinbelow for detecting spoofed DNS request packets may also be used by a standalone computer, running appropriate software, without a separate guard device.

Preferably, guard device 28 has sufficient processing capacity so that it does not itself become a bottleneck in the case of a DDoS attack. The guard device may use other mechanisms, as well, both to protect against attacks and to ensure that server 22 receives only as much traffic as it is able to sustain. Suitable mechanisms for these purposes are described in the above-mentioned U.S. patent applications. For example, as described in U.S. patent application Ser. No. 09/929,877, the guard device may include a weighted fair queuing (WFQ) module, which throttles the amount of traffic of different types that is allowed to be forwarded to server 22. Preferably, one queue is maintained for each concurrent IP source over TCP, along with a queue for each type of DNS packets that may be expected. Different queues may have different priority levels. As noted above, incoming packets that are suspected of having a spoofed IP source address are preferably relegated to a low-priority queue, or else are discarded altogether.

Alternatively or additionally, the guard device may be configured to serve as a reverse proxy, holding a cache of entries from the DNS database of DNS server 22. The cache may contain a full mirror copy of the DNS database, or only a selection of recently-requested records. The task of providing replies to DNS requests can then be distributed among several devices, each having a reverse proxy, which are spread over the network at key points. In time of attack, the reverse proxies are activated and act as additional DNS servers.

A number of exemplary challenge-response procedures that can be used by guard device 28 to verify the source addresses of incoming DNS requests are described hereinbelow with reference to FIGS. 2-5. In the methods shown in FIGS. 2, 3 and 4, the DNS protocol itself is used for this purpose, whereas the method of FIG. 5 uses features of TCP. A further method that uses DNS cookies in verifying IP source addresses is described in the above-mentioned patent application entitled, "Protecting Against Distributed Denial of Service Attacks." Other methods based on the principles of the present invention will be apparent to those skilled in the art and are considered to be within the scope of the present invention.

Figure 2:
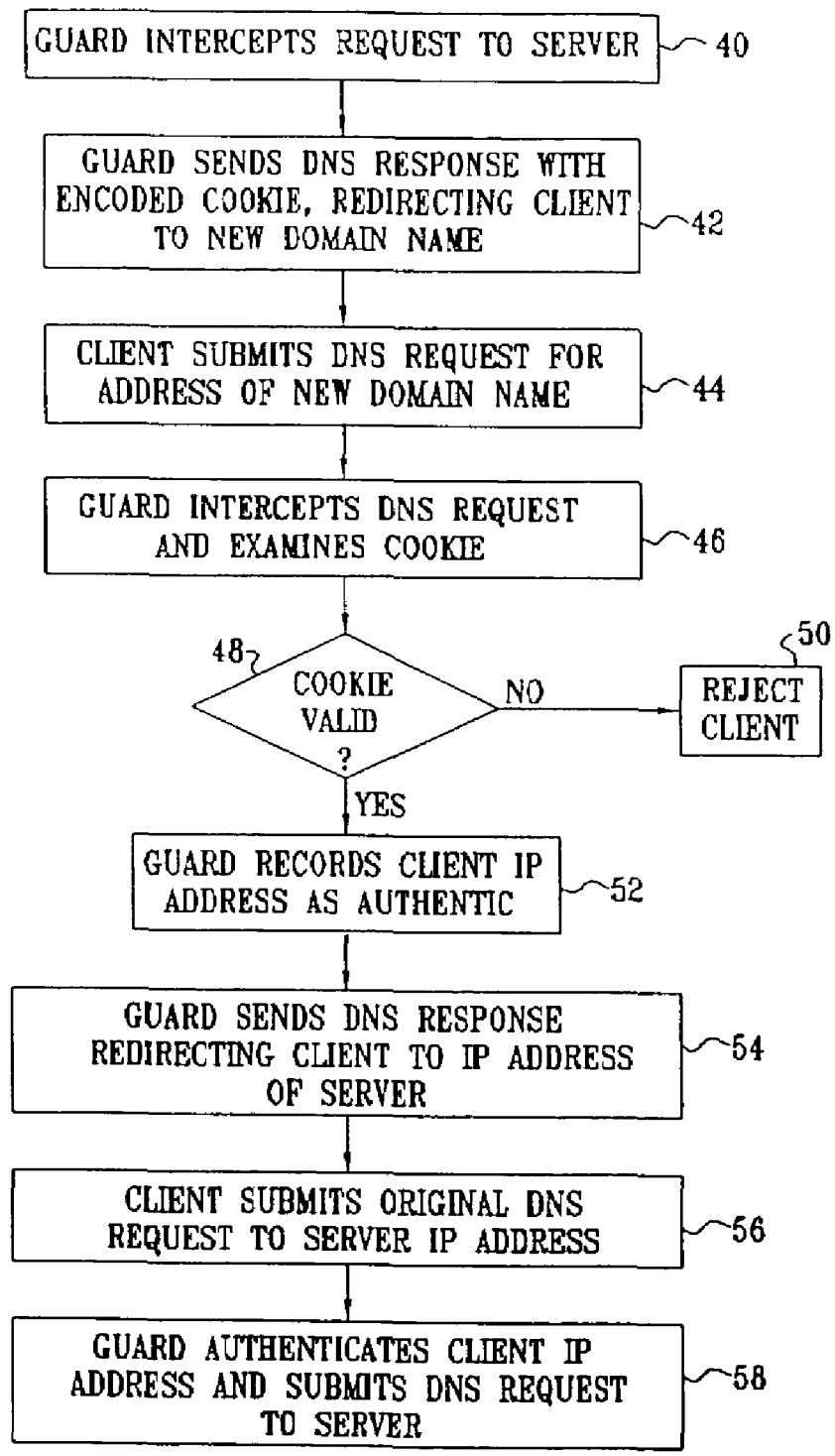

FIG. 2 is a flow chart that schematically illustrates a method for verifying authenticity of the source address of a DNS request, in accordance with a preferred embodiment of the present invention. The method is initiated when guard device 28 intercepts a DNS request packet addressed to DNS server 22, at a packet interception step 40. The DNS request typically has the form:

Client→server: Query
        (Qname=www.abra.kadabra.com, QTYPE=A,
        QCLASS=IN )

Clients 24 use this request to query server 22 for information (i.e., the IP address) associated with a given domain name, in this case: www.abra.kadabra.com. "QTYPE=A" is the most common type of client query, but the methods described herein are applicable to other QTYPEs, as well. Typically, guard device 28 screens all packets addressed to the server, based on the destination IP addresses of the packets. The guard device applies the method described hereinbelow when it detects an incoming DNS request packet whose source IP address does not appear in database 30, or a DNS source generating a suspicious request stream (for example, an abnormally large request volume, as noted above).

Guard device 28 responds to the client with a DNS response message, redirecting the client to a new domain name, at a guard redirection step 42. The destination IP address of the DNS response message is the source IP address from which the DNS request was received at step 40, while the source IP address is that of server 22. In the present embodiment, the message contains the following three resource records:

1. (www.abra.kadabra.com, NS, cookie-guard-id. kadabra.com, TTL=0). This record says that the authoritative DNS server for the name www.abra.kadabra.com is cookie-guard-id.kadabra.com. The latter name is an artificial domain name used by the guard device for verification purposes, as described below. "cookie" is a randomized, legitimate label, unique to the current communication exchange with this client and sufficiently long (for example, 32 bits—selected from a large enough set of labels) to provide uniqueness across all client sessions. Guard device 28 preferably stores the cookie in database 30, along with the IP address of this client. Alternatively, the guard device may use a predefined mathematical function (such as a hash function) to compute the cookie, based on the client IP address and possibly other parameters, so that storing the cookie is unnecessary.
2. (cookie-guard-id.kadabra.com, NS, cookie.kadabra.com, TTL=0). This record says that the authoritative DNS server for the domain name cookie-guard-id.kadabra.com is cookie.kadabra.com.
3. (cookie.kadabra.com, A, IP address of server, TTL=0). This record says that the IP address of cookie.kadabra.com is the IP address of server 22.

The TTL of all three resource records is set to zero, to tell the client that this information should be used only for the present exchange, and should not be stored for future use.

In accordance with the DNS protocol, client 24 responds to this message from guard device 28 by submitting a new DNS request, destined for the IP address of server 22, at a new request submission step 44. (This is the IP address of cookie.kadabra.com, which is the Name Server for cookie-guard-id.kadabra.com.) The client submits the request to the IP address of server 22, as provided by the DNS response message of step 42. The request submitted by the client at step 44 has the following form:

Client→server: Query (QNAME=cookie-guard-id.kadabra.com,QTYPE=A,QCLASS=IN),

Guard device 28 intercepts this message, as well, at a new message interception step 46. In order to verify the authenticity of the IP source address of the client sending the message, the guard device checks the validity of the "cookie" field in the artificial domain name cookie-guard-id.kadabra.com, at a cookie checking step 48. For this purpose, the guard preferably looks up the IP source address in database 30, and compares the cookie value recorded there to the value in the client query. Alternatively, the guard device may recompute the cookie value using the same function that it used to compute the cookie earlier at step 42, and compare this recomputed value to the value in the client query. In either case, if the cookie values do not match, the guard device considers the client to be illegitimate, and rejects the DNS request, at a rejection step 50.

If the cookie values do match properly at step 48, guard device 28 concludes that the IP source address of the requesting client is legitimate, and makes a record accordingly in database 30, at a recording step 52. The guard device then sends a further DNS response back to the client, telling the client that the IP address of cookie-guard-id.kadabra.com is the actual IP address of server 22, at a guard response step 54:

Guard→client (cookie-guard-id.kadabra.com, A, IP
        address of server, TTL=0)

This response prompts client 24 to resubmit its original DNS request (for the IP address of www.abra.kadabra.com) to server 22, at a resubmission step 56. The client addresses the request to the IP address of the server, as provided by the DNS response at step 54. Upon intercepting the new request, guard device 28 is able to authenticate the original DNS request, i.e., to verify that the IP source address of the client is legitimate and that the original DNS request was actually sent from this IP source address, at an authentication step 58, against the record it made in database 30 at step 52. Since the source address of the DNS request packet is legitimate, the guard device passes the packet to server 22, which responds directly to client 24 in the normal way. The guard device may then erase the record of the client's IP source address from database 30, or it may alternatively preserve the record for a certain period of time, for use in validating subsequent incoming packets.

In an alternative embodiment, the DNS response sent by guard device 28 at step 42 contains only a single resource record:

Guard→client (www.abra.kadabra.com, NS, cookie-
        guard-id.kadabra.com, TTL=0)

This alternative has the advantage of using network bandwidth more economically, but with a slight risk that legitimate clients will be misled and will fail to receive responses to their queries. The name "cookie-guard" is a single label formed by concatenating two bit vectors, "cookie" and "guard". The vector "cookie" is a randomized bit vector unique to the current communication with this client and consisting of sufficient number of bits (typically 32) to provide uniqueness across all client sessions. Although the cookie is randomized, it can be verified by the guard device, as described above. The bit vector "guard" is a static label to be used for communication with all clients of server 22.

Preferably, as in the preceding embodiment, the label "cookie-guard" is chosen so that the domain name cookie-guard.kadabra.com does not really exist in the domain kadabra.com. Since the "guard" vector is only part of the label, the option of acquiring the domain name "cookie-guard" is not available here, unless "cookie-guard" is separated into two separate labels: "cookie.guard".

Now, at step 44, client 24 submits the following DNS request to server 22:

Client→server: Query (QNAME=cookie-guard.ka-
        dabra.com,QTYPE=A,QCLASS=IN)

Because the new domain name provided by the guard device at step 42 (cookie-guard.kadabra.com) has the same suffix (kadabra.com) as the domain name in the original DNS request (www.abra.kadabra.com), the client will in all likelihood consider server 22 to be the authoritative name server. The client will therefore submit the new DNS request to the known IP address of server 22, as well. In the unlikely event that the client does not have the IP address of server 22 in its cache, the client will consult the root name server, in accordance with the DNS protocol, and will presumably be directed to the IP address of server 22.

Guard device 28 intercepts the client request at step 46, and checks the validity of the "cookie" field at step 48, as described above. Assuming the cookie is correct, the guard device records the client IP address in database 30 at step 52, and then sends the following response to the client at step 54:

Guard→client (cookie-guard.kadabra.com, A, IP
        address of server, TTL=0).

The client and guard device then proceed through steps 56 and 58 as described above.

Figure 3:
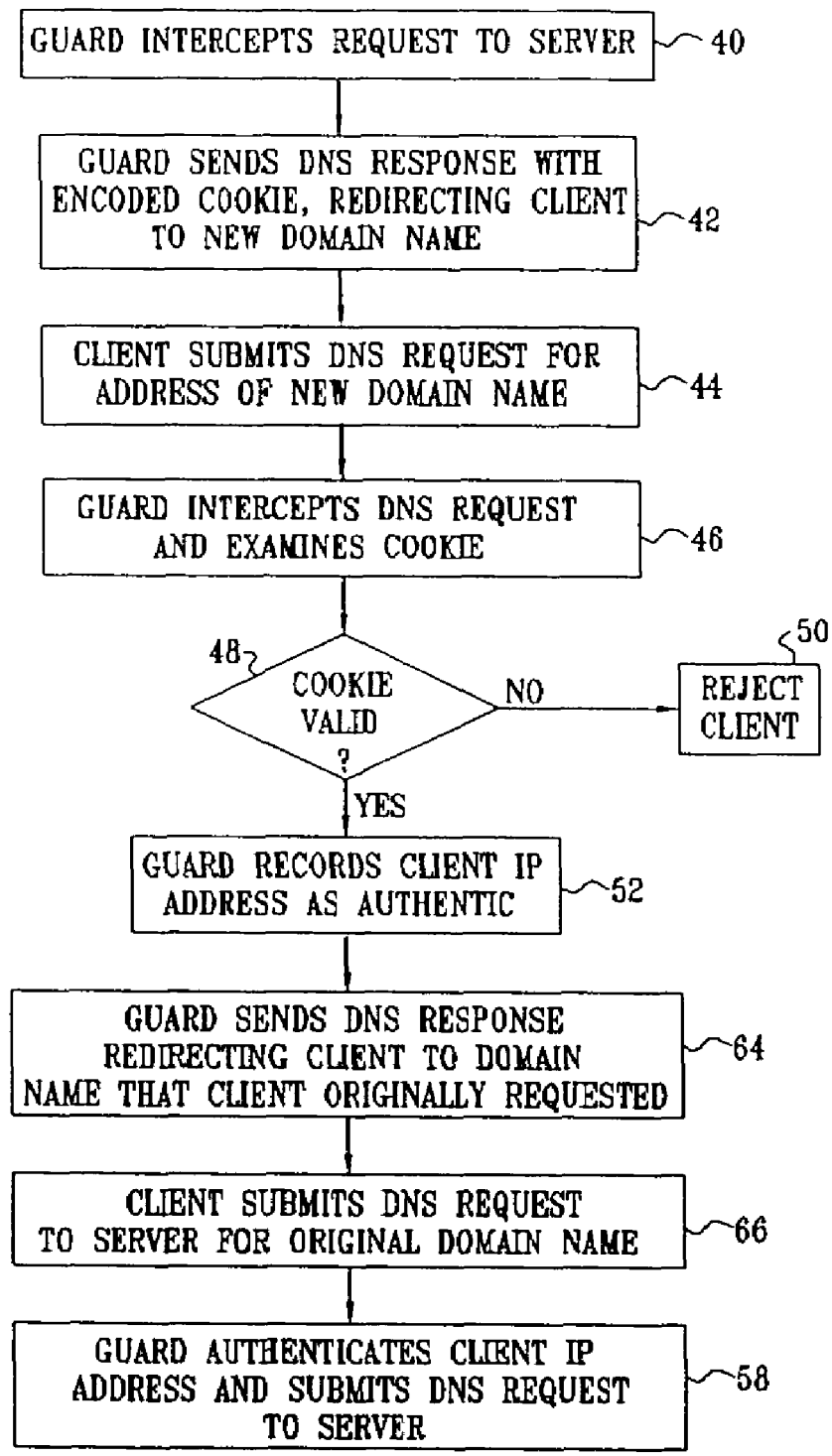

FIG. 3 is a flow chart that schematically illustrates a method for verifying authenticity of the source address of a DNS request, in accordance with another preferred embodiment of the present invention. As in the preceding embodiments, the method is initiated at step 40 when guard device 28 intercepts a DNS request packet addressed to DNS server 22. In this case, however, the resource record returned by guard device 28 to client 24 at step 42 is of the CNAME type:

Guard→client (www.abra.kadabra.com, Cname,
        www.abra.cookie-guard.kadabra.com, TTL=0)

As in the previous embodiments, "cookie" is a unique, randomized label, and "guard" is chosen in such a way that the domain name cookie-guard.kadabra.com does not really exist in kadabra.com.

The client interprets this response to mean that www.abra.kadabra.com is an alias for www.abra.cookie-guard.kadabra.com, and submits the following query at step 44:

Client→server: Query(QNAME=www.abra.cookie-
        guard.kadabra.com,QTYPE='A',QLASS=IN)

Guard device 28 intercepts and processes this query in the manner described above at steps 46-52. If the guard device determines the cookie to be valid at step 48, it adds a record to database 30 and sends another DNS response containing a CNAME-type record, at a redirection step 64. The response has the following form, which has the effect of redirecting client 24 to the domain name that it originally requested:

Guard→client (www.abra.cookie-guard.kadabra.com,
        Cname, www.abra.kadabra.com, TTL=0)

This response causes the client to submit a new request to server 22, at a new request step 66, asking again for the IP address of the original domain name www.abra.kadabra.com. The guard device validates the source IP address of the request against the record that it made at step 52, and submits the request to the server, at step 58.

Figure 4:
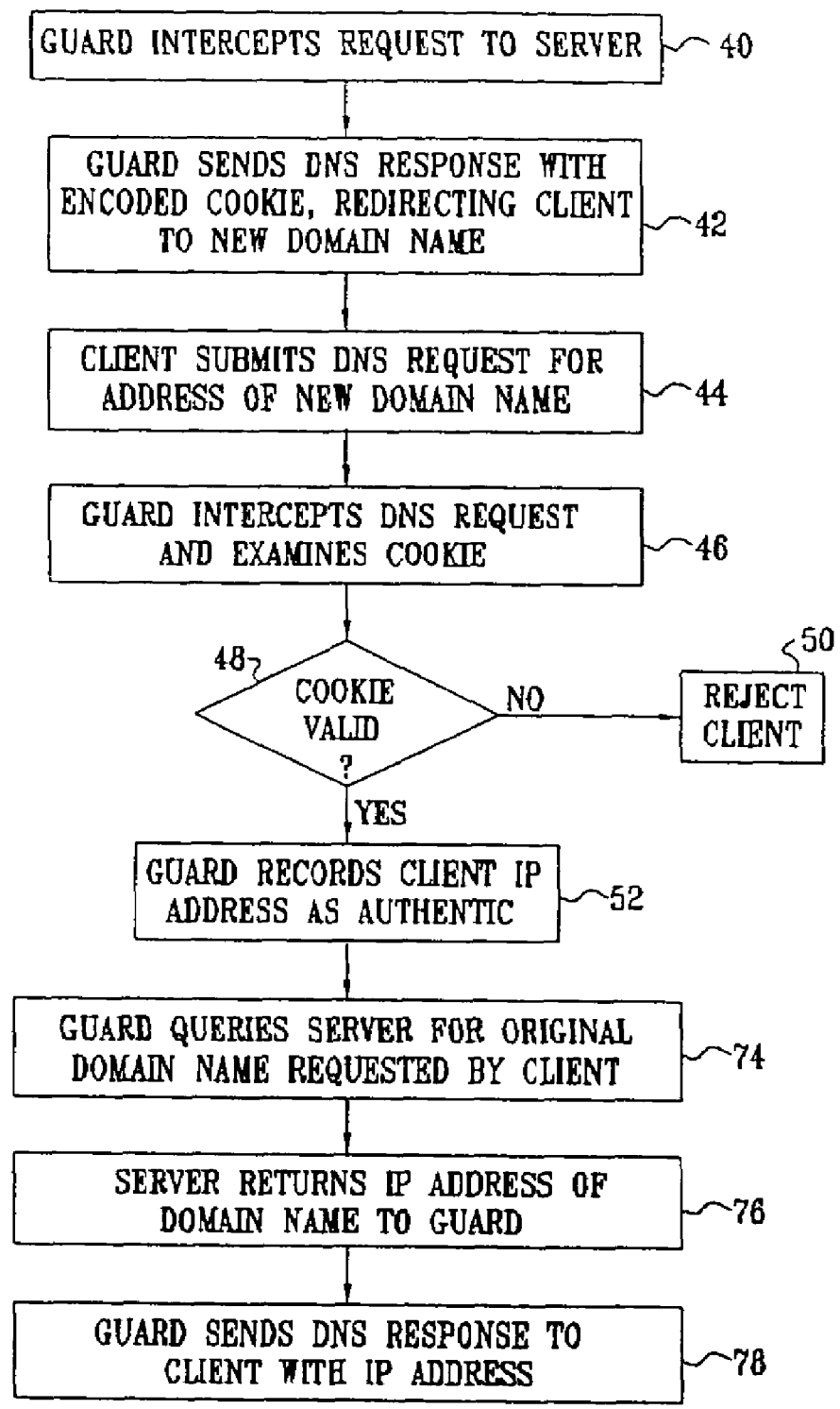

FIG. 4 is a flow chart that schematically illustrates a method for verifying authenticity of the source address of a DNS request, in accordance with still another preferred embodiment of the present invention. In this case, after intercepting the client query at step 40, guard device 28 sends the following DNS response at step 42:

Guard→client: (www.abra.kadabra.com, Cname,
        www.abra.cookie-guard.kadabra.com)

The original domain name (www.abra.kadabra.com) is embedded in the alias provided by the DNS response.

Because the new domain name has the same suffix (kadabra.com) as the original domain name, client 24 submits a new DNS request at step 44 for the IP address of the new domain name:

ClientΛserver: Query(QNAME=www.abra.cookie-
        guard.kadabra.com,QTYPE=A,QCLASS=IN)

Guard device 28 intercepts this message at step 46, and verifies the "cookie" field at step 48, making a record in database 30, at step 52, if the cookie is valid.

The guard device is also able to recover the domain name that was the object of the original query by client 24, just by removing the substring "cookie-guard" from the domain name in the query received at step 46. Guard device 28 queries server 22 for the IP address of the recovered domain name, at a guard querying step 74. The query is a DNS request of the following form:

Guard→server: Query
        (QNAME=www.abra.kadabra.com, QTYPE=A,
        QCLASS=IN)

This DNS request includes a unique ID inserted by the guard device, in accordance with the DNS protocol.

Server 22 returns a DNS response to guard device 28, at a guard response step 76. This response contains the IP address of www.abra.kadabra.com, along with the ID inserted by the guard device at step 74. The guard forwards this information to client 24 in a DNS response, at a client response step 78:

Guard→client: Reply (IP address of (www.abra.
        cookie-guard.kadabra.com)

This response answers the DNS request submitted by the client at step 44, and contains the query ID given by the client request (rather than the query ID used at steps 74 and 76). Having provided the client with the IP address that it originally requested, the guard device can now erase the record it created in database 30 at step 52. The embodiment of FIG. 4 thus reduces the number of messages that must be exchanged over network 26 in order to provide the client with the requested information, relative to the preceding embodiments, at the expense of an additional processing burden on guard device 28.

FIG. 5 is a flow chart that schematically illustrates a method for verifying authenticity of the source address of a DNS request, in accordance with yet another preferred embodiment of the present invention. This method uses features of the TCP three-way handshake to verify the IP source address of a DNS request packet that is sent to server 22 by an unknown client 24 over UDP. As in the methods described above, the incoming DNS request is intercepted by guard device 28, at an interception step 80.

In order to invoke the TCP handshake, guard device 28 sends client 24 a DNS response in which the "TC" bit is set, at an invocation step 82. Conventionally, according to the DNS protocol, a DNS server sets the TC bit in order to tell the requesting client that the DNS response is too long to fit into a UDP packet. The client is then required to repeat the DNS request over a TCP connection with the server. Therefore, upon receiving the response sent by the guard device, the client initiates a TCP three-way handshake, at a handshaking step 84, in order to open a TCP connection with the DNS server (or actually, with the guard device).

As the first step in the handshake, the client sends a TCP SYN packet, which is received by the guard device, at a client authentication step 86. The guard device responds by sending a SYN-ACK packet back to the client. The client must then respond with its own ACK in order to complete the connection. According to TCP convention, the SYN, SYN-ACK and ACK packets must all contain appropriate sequence numbers in their TCP headers. If the "client" is a spoofed source, it will not receive the SYN-ACK, and therefore will not return the final ACK. Thus, if guard device 28 observes SYN and ACK packets from the same IP source address, with the appropriate sequence number in the ACK packet, it can conclude that the IP source address is valid, at an authentication success step 88. Otherwise, the client DNS request is rejected, at a client rejection step 90.

Additional methods of client authentication may also be used in conjunction with the three-way handshake at step 86. For example, the guard device may examine and verify the IP Time-To-Live (TTL) values of the packets received from client 24, as described in the above-mentioned patent application entitled "Protecting Against Distributed Denial of Service Attacks."

Upon successful completion of the handshake procedure, a TCP connection is established between client 24 and guard device 28, at a connection stage 92. Now the client can resend its original DNS request over the TCP connection, at a request resubmission step 94. Upon receiving this request, the guard device is assured that the source IP address of the client is legitimate, and not spoofed. Therefore, the guard device submits a DNS request to DNS server 22, asking for the information requested by the client, at a request submission step 96. (The guard device may use either UDP or TCP packets to pass the request to the server.) Upon receiving the response from the server, the guard device returns an appropriate DNS response to the client, over the existing TCP connection, at a final response step 98. The TCP connection may then be closed, or it may be held open for some period of time to enable the client to submit additional DNS requests.

Although the preferred embodiments described herein make reference to specific communication protocols and conventions, the principles of the present invention may similarly be applied in other data communication contexts. Thus, the present invention may be used in authenticating requests for network address information that may be made using protocols other than DNS. Furthermore, a guard device may intercept packets requesting other types of information (not only addresses) from a server, and may validate such packets by returning coded information to the requesters, and then checking the responses that are subsequently received. In particular, other application layer protocols, such as HTTP, provide redirection mechanisms that can be used by the guard device in authenticating clients, in a manner similar to that described above with respect to DNS.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for authenticating communication traffic, comprising:
    receiving a first request, sent over a network from a source address, to provide first network information regarding a first domain name;
    sending a response to the source address in reply to the first request;
    receiving a second request from the source address, in reply to the response, to provide second network information regarding a second domain name; and
    assessing authenticity of the first request based on the second request.

2. A method according to claim 1, and comprising, if the first request is assessed to be authentic, sending a further response to the source address containing the network information corresponding to the given domain name.

3. A method according to claim 2, wherein assessing the authenticity comprises discarding the first request if the first request is not assessed to be authentic.

4. A method according to claim 2, wherein the network information comprises a network address associated with the domain name.

5. A method according to claim 1, wherein sending the response comprises encoding information in the response, and wherein assessing the authenticity comprises checking the second request for the encoded information.

6. A method according to claim 1, wherein receiving the first request comprises intercepting the first request prior to delivery of the first request to a destination address of the first request, and comprising submitting the first request to the destination address responsively to the assessed authenticity of the first request.

7. A method according to claim 6, wherein assessing the authenticity comprises making a record of the source address as an authentic address, and wherein submitting the first request comprises verifying the source address based on the record, and allowing the network information to be furnished to the verified source address.

8. A method according to claim 1, wherein first and second requests and the response comprises data packets, and wherein the source address comprises an Internet Protocol (IP) address.

9. A method according to claim 8, wherein the first and second requests respectively comprise first and second Domain Name System (DNS) requests, and wherein the response comprises a DNS response.

10. A method for authenticating communication traffic, comprising:
receiving a first request, sent over a network from a source address, to provide network information regarding a given domain name;
sending a response to the source address in reply to the first request;
receiving a second request from the source address in reply to the response; and
assessing authenticity of the first request based on the second request,
wherein sending the response comprises encoding information in the response, and wherein assessing the authenticity comprises checking the second request for the encoded information, and
wherein encoding the information comprises encoding the information in an artificial domain name, and wherein receiving the second request comprises receiving a query for the network information corresponding to the artificial domain name.

11. A method for authenticating communication traffic, comprising:
receiving a data packet sent over a network from a source address to a destination address;
sending an outgoing Domain Name System (DNS) message to the source address;
receiving an incoming DNS message in response to the outgoing DNS message; and
processing the incoming DNS message so as to assess authenticity of the received data packet,
wherein receiving the data packet comprises receiving a first DNS request directed to a DNS server, and wherein sending the outgoing DNS message comprises sending a DNS response, and wherein receiving the incoming DNS message comprises receiving a second DNS request, and
wherein receiving the first DNS request comprises receiving a request from a client for network information regarding a first domain name, and wherein sending the DNS response comprises sending a first DNS response redirecting the client to submit the second DNS request with regard to a second domain name.

12. A method according to claim 11, and comprising, if the received data packet is assessed to be authentic, sending a further DNS response to the source address so as to provide a resource record from the DNS server as requested by the first DNS request.

13. A method according to claim 12, wherein receiving the first DNS request comprises intercepting the first DNS request prior to delivery of the first DNS request to the DNS server, and comprising allowing the DNS server to provide the resource record to the source address responsively to the assessed authenticity of the of the received data packet.

14. A method according to claim 11, wherein redirecting the client comprises encoding information in the second domain name, and wherein processing the incoming DNS message comprises checking for the encoded information in the second DNS request.

15. A method according to claim 14, and comprising, if the encoded information in the second DNS request is correct, sending a second DNS response redirecting the client to submit a third DNS request in order to receive the network information requested by the first DNS request.

16. A method according to claim 14, wherein sending the outgoing DNS message comprises sending a first DNS packet containing encoded information, and wherein receiving the incoming DNS message comprises receiving a second DNS packet, and wherein processing the incoming DNS message comprises checking the second DNS packet for the encoded information.

17. A method according to claim 16, wherein sending the first DNS packet comprises inserting the encoded information in an artificial domain name in the first DNS packet, and wherein checking the second DNS packet comprises examining the artificial domain name in the second DNS packet.

18. An apparatus for authenticating communication traffic, comprising a guard device, which is adapted to receive a first request, sent over a network from a source address, to provide first network information regarding a first domain name, to send a response to the source address in reply to the first request, to receive a second request from the source address, in reply to the response, to provide second network information regarding a second domain name, and to assess authenticity of the first request based on the second request.

19. An apparatus according to claim 18, wherein the guard device is adapted to intercept the first request prior to delivery of the first request to a server holding the network information, and upon assessing the first request to be authentic, to submit the first request to the server, so as to provide a further response to the source address containing the network information corresponding to the given domain name.

20. An apparatus according to claim 19, wherein the guard device is adapted to retrieve the network information from the server and to send the further response containing the retrieved network information.

21. An apparatus according to claim 19, wherein the guard device is adapted to discard the first request if the first request is not assessed to be authentic.

22. An apparatus according to claim 19, and comprising a memory, wherein the guard device is adapted, upon assessing the first request to be authentic, to make a record of the source address in the memory as an authentic address, and upon receiving a further request from the source address, to verify the source address of the further request based on the record, so as to allow the server to furnish the network information to the verified source address.

23. An apparatus according to claim 18, wherein the network information comprises a network address associated with the domain name.

24. An apparatus according to claim 18, wherein the guard device is adapted to encode information in the response, and to assess the authenticity of the first request by checking the second request for the encoded information.

25. An apparatus according to claim 18, wherein the first and second requests and the response comprises data packets, and wherein the source address comprises an Internet Protocol (IP) address.

26. An apparatus according to claim 25, wherein the first and second requests respectively comprise first and second Domain Name System (DNS) requests, and wherein the response comprises a DNS response.

27. An apparatus for authenticating communication traffic, comprising a guard device, which is adapted to receive a first request, sent over a network from a source address, to provide network information regarding a given domain name, to send a response to the source address in reply to the first request, to receive a second request from the source address in reply to the response, and to assess authenticity of the first request based on the second request,
wherein the guard device is adapted to encode information in the response, and to assess the authenticity of the first request by checking the second request for the encoded information, and
wherein the guard device is adapted to encode the information in an artificial domain name, and to generate the response so as to cause a client at the source address to submit in the second request a query for the network information corresponding to the artificial domain name.

28. An apparatus for authenticating communication traffic, comprising a guard device, which is adapted to receive a data packet sent over a network from a source address to a destination address, to send an outgoing Domain Name System (DNS) message to the source address, to receive an incoming DNS message in response to the outgoing DNS message, and to process the incoming DNS message so as to assess authenticity of the received data packet,
wherein the data packet comprises a first DNS request directed to a DNS server, and wherein the outgoing DNS message comprises a DNS response, and the incoming DNS message comprises a second DNS request, and
wherein the first DNS request comprises a request from a client for network information regarding a first domain name, and wherein the DNS response comprises a first DNS response redirecting the client to submit the second DNS request with regard to a second domain name.

29. An apparatus according to claim 28, wherein the guard device is adapted to intercept the first DNS request prior to delivery of the first DNS request to the DNS server, and upon assessing the first DNS request to be authentic, to submit the first DNS request to the DNS server, so as to provide to the source address a resource record from the DNS server as requested by the first DNS request.

30. An apparatus according to claim 28, wherein the guard device is adapted to encode information in the second domain name, and to check for the encoded information in the second DNS request so as to assess the authenticity of the first DNS request.

31. An apparatus according to claim 30, wherein the guard device is adapted, if the encoded information in the second DNS request is correct, to send a second DNS response redirecting the client to submit a third DNS request in order to receive the requested network information.

32. An apparatus according to claim 28, wherein the outgoing DNS message comprises a first DNS packet containing encoded information, and wherein the incoming DNS message comprises a second DNS packet, and wherein the guard device is adapted to check the second DNS packet for the encoded information so as to assess the authenticity of the received data packet.

33. An apparatus according to claim 32, wherein the guard device is adapted to insert the encoded information in an artificial domain name in the first DNS packet, and to check the second DNS packet by examining the artificial domain name in the second DNS packet.

34. A computer software product for authenticating communication traffic, comprising a computer-readable medium in which program instructions are stored, wherein the instructions, when read by a computer, cause the computer to receive a first request, sent over a network from a source address, to provide first network information regarding a first domain name, to send a response to the source address in reply to the first request, to receive a second request from the source address, in reply to the response, to provide second network information regarding a second domain name, and to assess authenticity of the first request based on the second request.

35. A product according to claim 34, wherein the instructions cause the computer to intercept the first request prior to delivery of the first request to a server holding the network information, and upon assessing the first request to be authentic, to submit the first request to the server, so as to provide a further response to the source address containing the network information corresponding to the given domain name.

36. A product according to claim 35, wherein the instructions cause the computer to retrieve the network information from the server and to send the further response containing the retrieved network information.

37. A product according to claim 35, wherein the instructions cause the computer to discard the first request if the first request is not assessed to be authentic.

38. A product according to claim 35, wherein the instructions cause the computer, upon assessing the first request to be authentic, to make a record of the source address in a memory of the computer as an authentic address, and upon receiving a further request from the source address, to verify the source address of the further request based on the record, so as to allow the server to furnish the network information to the verified source address.

39. A product according to claim 34, wherein the network information comprises a network address associated with the domain name.

40. A product according to claim 34, wherein the instructions cause the computer to encode information in the response, and to assess the authenticity of the first request by checking the second request for the encoded information.

41. A product according to claim 34, wherein first and second requests and the response comprises data packets, and wherein the source address comprises an Internet Protocol (IP) address.

42. A product according to claim 41, wherein the first and second requests respectively comprise first and second Domain Name System (DNS) requests, and wherein the response comprises a DNS response.

43. A computer software product for authenticating communication traffic, comprising a computer-readable medium in which program instructions are stored, wherein the instructions, when read by a computer, cause the computer to receive a first request, sent over a network from a source address, to provide network information regarding a given domain name, to send a response to the source address in reply to the first request, to receive a second request from the source address in reply to the response, and to assess authenticity of the first request based on the second request,
wherein the instructions cause the computer to encode information in the response, and to assess the authenticity of the first request by checking the second request for the encoded information, and
wherein the instructions cause the computer to encode the information in an artificial domain name, and to generate the response so as to cause a client at the source address to submit in the second request a query for the network information corresponding to the artificial domain name.

44. A computer software product for authenticating communication traffic, comprising a computer-readable medium in which program instructions are stored, wherein the instructions, when read by a computer, cause the computer to receive a data packet sent over a network from a source address to a destination address, to send an outgoing Domain Name System (DNS) message to the source address, to receive an incoming DNS message in response to the outgoing DNS message, and to process the incoming DNS message so as to assess authenticity of the received data packet,
wherein the data packet comprises a first DNS request directed to a DNS server, and wherein the outgoing DNS message comprises a DNS response, and the incoming DNS message comprises a second DNS request, and
wherein the first DNS request comprises a request from a client for network information regarding a first domain name, and wherein the DNS response comprises a first DNS response redirecting the client to submit the second DNS request with regard to a second domain name.

45. A product according to claim 44, wherein the instructions cause the computer to intercept the first DNS request prior to delivery of the first DNS request to the DNS server, and upon assessing the first DNS request to be authentic, to submit the first DNS request to the DNS server, so as to provide to the source address a resource record from the DNS server as requested by the first DNS request.

46. A product according to claim 44, wherein the instructions cause the computer to encode information in the second domain name, and to check for the encoded information in the second DNS request so as to assess the authenticity of the first DNS request.

47. A product according to claim 46, wherein the instructions cause the computer, if the encoded information in the second DNS request is correct, to send a second DNS response redirecting the client to submit a third DNS request in order to receive the requested network information.

48. A product according to claim 44, wherein the outgoing DNS message comprises a first DNS packet containing encoded information, and wherein the incoming DNS message comprises a second DNS packet, and wherein the instructions cause the computer to check the second DNS packet for the encoded information so as to assess the authenticity of the received data packet.

49. A product according to claim 48, wherein the instructions cause the computer to insert the encoded information in an artificial domain name in the first DNS packet, and to check the second DNS packet by examining the artificial domain name in the second DNS packet.

* * * * *